United States Patent
Martin

(10) Patent No.: US 9,553,437 B1
(45) Date of Patent: Jan. 24, 2017

(54) ELECTRICAL OUTLET SAFETY COVER HAVING A CAP REMOVABLY ATTACHED TO A SLOT IN A REAR SIDE OF A COVER PLATE

(71) Applicant: Robert Dale Martin, Checotah, OK (US)

(72) Inventor: Robert Dale Martin, Checotah, OK (US)

( * ) Notice: Subject to any disclaimer, the term of this patent is extended or adjusted under 35 U.S.C. 154(b) by 0 days.

(21) Appl. No.: 15/041,399

(22) Filed: Feb. 11, 2016

Related U.S. Application Data

(63) Continuation-in-part of application No. 14/887,458, filed on Oct. 20, 2015.

(60) Provisional application No. 62/091,899, filed on Dec. 15, 2014.

(51) Int. Cl.
*H01R 13/44* (2006.01)
*H02G 3/14* (2006.01)
*H01R 13/453* (2006.01)

(52) U.S. Cl.
CPC ............ *H02G 3/14* (2013.01); *H01R 13/4536* (2013.01)

(58) Field of Classification Search
CPC ... H01R 13/44; H01R 13/447; H01R 13/4532; H01R 13/4536
USPC .................. 439/133–136; 174/66–67
See application file for complete search history.

(56) References Cited

U.S. PATENT DOCUMENTS

| | | | | |
|---|---|---|---|---|
| 4,584,430 A | * | 4/1986 | Belknap | H01R 13/4532 174/66 |
| 4,952,756 A | * | 8/1990 | Meyers | H02G 3/14 174/67 |
| 5,198,618 A | * | 3/1993 | Shieh | H01R 13/4534 174/67 |
| 6,364,673 B1 | * | 4/2002 | Lee | H01R 13/4532 174/67 |
| 6,767,229 B1 | * | 7/2004 | Wang | H01R 13/4532 439/145 |
| 6,780,031 B1 | * | 8/2004 | Valls | H01R 13/4534 439/136 |
| 8,096,819 B1 | * | 1/2012 | Rosero | H01R 13/4536 439/135 |
| 2004/0074663 A1 | * | 4/2004 | Broussard, Jr. | H02G 3/14 174/67 |
| 2009/0314509 A1 | * | 12/2009 | Eshelman | H02G 3/14 174/66 |

* cited by examiner

*Primary Examiner* — Chandrika Prasad
(74) *Attorney, Agent, or Firm* — Molly D. McKay

(57) ABSTRACT

An electrical outlet safety cover consisting of a cover plate removable caps to cover and prevent access by children to underlying electrical outlets. The cover plate replaces a standard electrical cover plate on an electrical outlet and secures to the electrical outlet with an attachment screw. A rear side of the cover plate is provided with slots on each side of each electrical socket access opening into which tabs provided on sides of the child proof safety caps insert as a means of removably securing the caps over the electrical outlets. A tab housing surrounds each slot to prevent the tabs from inserting too far inwardly when inserting or removing the caps from the cover plate. The caps are sufficiently large to cover the attachment screw and to prevent choking by a child.

9 Claims, 2 Drawing Sheets

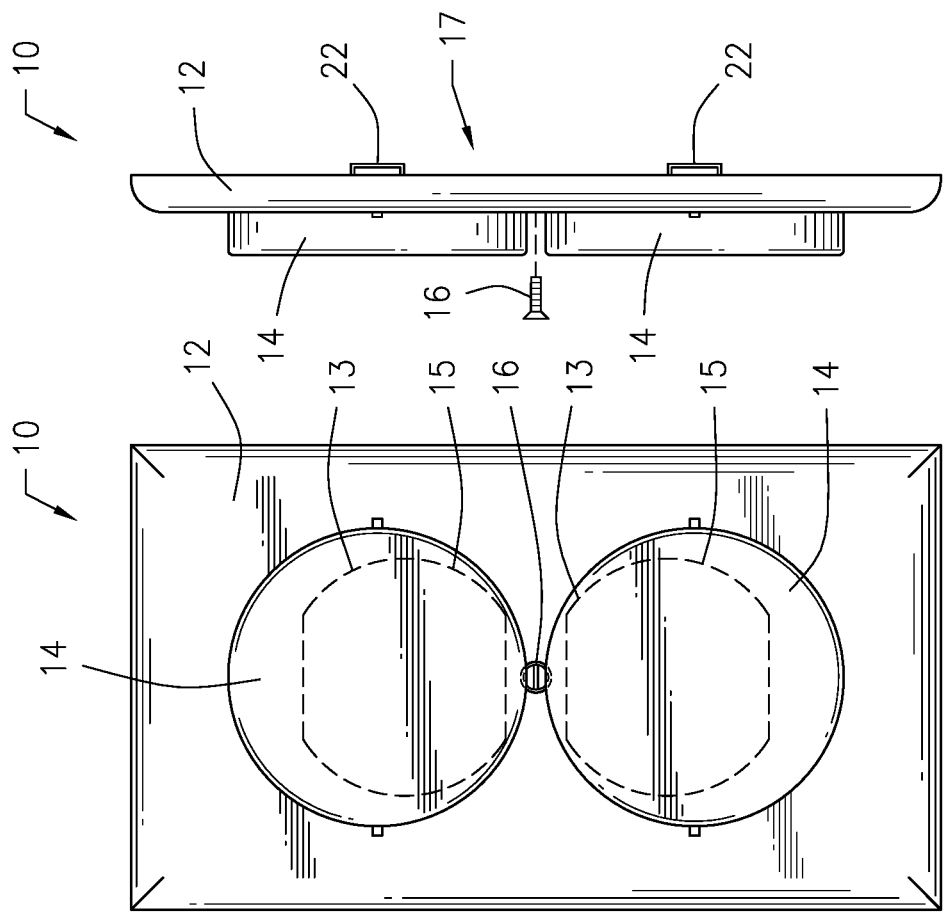
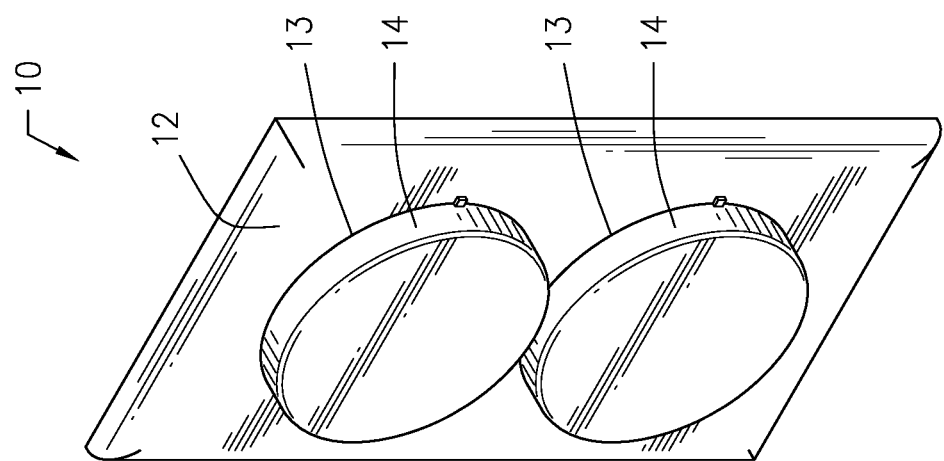

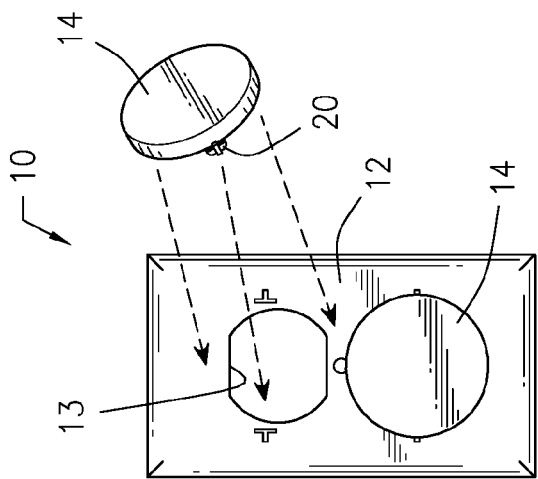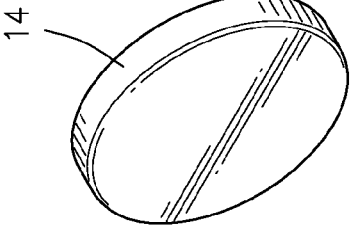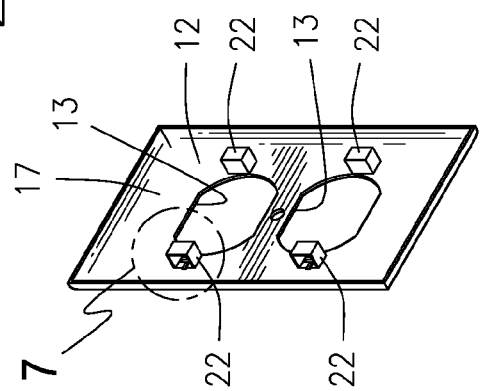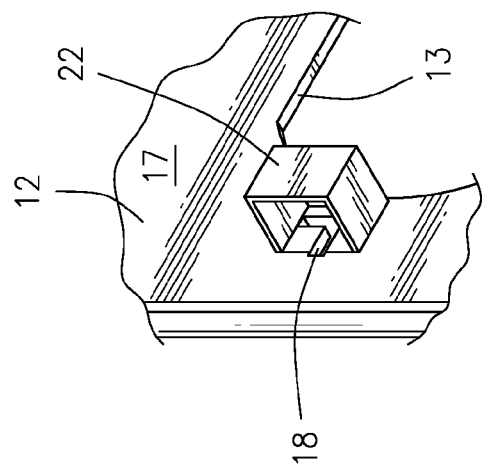

ELECTRICAL OUTLET SAFETY COVER HAVING A CAP REMOVABLY ATTACHED TO A SLOT IN A REAR SIDE OF A COVER PLATE

CROSS-REFERENCE TO RELATED APPLICATIONS

The present application is a continuation in part of U.S. patent application Ser. No. 14/887,458 for Electrical Outlet Safety Cover which was filed on Oct. 20, 2015 and which in turn claims priority to U.S. Provisional Patent Application Ser. No. 62/091,899 for Electrical Outlet Safety Cover which was filed on Dec. 15, 2014.

BACKGROUND OF THE INVENTION

1. Field of the Invention

The present invention relates to an electrical outlet cover plate with covers that removably attach to the cover plate in order to cover electrical sockets provided on an electrical outlet and to prevent unwanted access to the electrical sockets.

2. Description of the Related Art

Various devices have been created for preventing children from inserting objects into electrical sockets of electrical outlets and thus being electrocuted. One such device that is designed to prevent access to electrical sockets by children is an electrically non-conductive plastic device provided with a pair of prongs where the prongs insert into the electrical socket and thereby prevent access to the socket.

The problem with this device and with other similar designs is that older children can pry the plastic device out of the electrical socket and thus gain access to the socket.

Still other devices for addressing this problem are specially designed electrical outlets or electrical sockets. However, these require replacement of the electrical outlet which can be expensive.

The present invention addresses this problem by providing a cover plate that fits over a standard electrical outlet and is provided with child proof removable caps that cover the electrical sockets thereby preventing access by children to the electrical sockets. This device is economical, easily installed and effective in preventing access by children to the electrical sockets while allowing an adult to easily remove one or more of the caps to obtain access to the sockets.

SUMMARY OF THE INVENTION

The present invention is an electrical outlet safety cover consisting of a cover plate and associated caps for covering electrical sockets on electrical outlets. The cover plate attaches to a standard electrical outlet as a replacement for the standard electrical cover plate normally found associated with electrical outlets. The cover plate fits over a standard electrical outlet and secures thereto with a screw that engages the electrical outlet.

A rear side of the cover plate is provided with a slots, with one slot located on each side of openings in the cover plate for accessing the electrical sockets. Outwardly extending tabs provided on child proof safety caps insert into these slots as a means of removably securing the caps over the openings in the cover plate and over the electrical sockets to prevent access to the electrical sockets by children. On the rear side of the cover plate, each slot is surrounded with a tab housing. The purpose of the tab housing is to limit the inward travel of the tabs as the caps are being inserted into and removed from the openings in the cover plate. In order to either attach the caps to the cover plate or detach the caps from the cover plate, opposite sides of the caps are squeezed together to reduce the distance between the tabs so that the tabs can pass through the openings in the cover plate.

The invention is constructed so that the individual caps can be attached to the cover plate simply by squeezing or compressing each cap so that the tabs move together allowing the tabs to pass through an opening in the cover plate, and then releasing the cap so that the tabs once again move outward and engage the slots located on the rear side of the cover plate. This is repeated for the other cap and the other opening and secures the caps over the openings in the cover plate and over the electrical sockets.

In order to remove the caps from the cover plate, the caps are first squeezed together to move the tabs out of the slots and then the caps are pulled outward through the openings to disengage the caps from the cover plate.

The caps are difficult for a child to remove from the cover plate. The caps and cover plate are designed to prevent a child from having access to the electrical outlets and to prevent an object from being inserted into the electrical outlets and causing an electrical shock to the person inserting the object.

The caps are sufficiently large as to cover the screw that attaches the cover plate over the electrical outlets when the caps are attached to the cover plate. This prevents a child from accessing the screw with a screw driver and thereby prevents the cover plate from being accidentally removed by a small child. Also the caps are sufficiently large so that even if a child were able to removed one of the caps, the cap is large enough to make it difficult for a small child to get the cap into their mouth a sufficient distance to choke on it.

BRIEF DESCRIPTION OF THE DRAWINGS

FIG. 1 is a front perspective view of an electrical outlet safety cover constructed in accordance with a preferred embodiment of the present invention.

FIG. 2 is a front plan view of the electrical outlet safety cover of FIG. 1 shown with the underlying concealed electrical sockets shown in outline.

FIG. 3 is side view of the electrical outlet safety cover of FIGS. 1 and 2.

FIG. 4 is a partially exploded view of the electrical outlet safety cover of FIG. 2.

FIG. 5 is a perspective view of the cap from FIG. 4.

FIG. 6 is a rear perspective view of the electrical outlet safety cover of FIG. 4 shown with the caps removed.

FIG. 7 is an enlarged view of the slot and tab housing shown within circle 7 of FIG. 6.

DETAILED DESCRIPTION OF THE PREFERRED EMBODIMENT

Referring now to the drawings and initially to FIG. 1, there is illustrated an electrical outlet safety cover 10 that is constructed in accordance with a preferred embodiment of the present invention. Referring also to FIGS. 2-5, the cover 10 consists of a cover plate 12 and associated child proof safety caps 14 for covering electrical socket access openings 13 provided in the cover plate 12. The electrical socket access openings 13 are provided to allow access to the underlying electrical sockets of the electrical outlet 15. The cover plate 12 attaches to a standard electrical outlet as a replacement for the standard electrical cover plate normally found associated with electrical outlets 15. The cover plate 12 fits over a standard electrical outlet 15 and secures thereto with a screw 16 that engages a screw receiving opening provided in the electrical outlet 15.

Referring also to FIGS. 6 and 7, a rear side 17 of the cover plate 12 is provided with a slots 18, with one slot 18 located on each side of the electrical socket access openings 13. Outwardly extending tabs 20 provided on the child proof safety caps 14 insert into these slots 18 as a means of removably securing the caps 14 over the openings 13 in the cover plate 12 and over the underlying electrical sockets to prevent access to the electrical sockets by children.

On the rear side 17 of the cover plate 12, each slot 18 is surrounded with a tab housing 22. The purpose of the tab housing 22 is to limit the inward travel of the tabs 20 as the caps 14 are being inserted into and removed from the openings 13 in the cover plate 12. In order either to attach the caps 14 to the cover plate 12 or to detach the caps 14 from the cover plate 12, opposite sides of each cap 14 are squeezed together to reduce the distance between the tabs 20 so that the tabs 20 can pass through the openings 13 in the cover plate 12.

The invention is constructed so that the individual caps 14 can be attached to the cover plate 12 simply by squeezing or compressing each cap 14 so that the tabs 20 move together sufficiently to allow the tabs 20 to pass through their associated opening 13 in the cover plate 12, and then releasing the cap 14 so that the tabs 20 once again move outward and engage the slots 13 located on the rear side 17 of the cover plate 12. This is repeated for the other cap 14 and the other opening 13 and secures the caps 14 over the openings 13 in the cover plate 12 and over the electrical sockets in the electrical outlet 15.

In order to remove the caps 14 from the cover plate 12, the caps 14 are first squeezed together to move the tabs 20 inwardly toward each other and out of the slots 13, and then the caps 14 are pulled outward through the openings 13 thereby disengaging the caps 14 from the cover plate 12.

It is to be understood that each cap 14 is independently attachable to and detachable from the cover plate 12. Also, although the cover 10 has been described and illustrated as being designed for a standard two socket electrical outlet 15, the invention is not so limited.

The caps 14 are difficult for a child to remove from the cover plate 12. The caps 14 and cover plate 12 are designed to prevent a child from having access to the underlying electrical outlets 15 to prevent a foreign object from being inserted into the electrical outlets 15 and causing an electrical shock to the person inserting the object.

As shown in FIG. 2, the caps 14 are sufficiently large as to cover the screw 16 that attaches the cover plate 12 over the electrical outlets 15 when the caps 14 are attached to the cover plate 12. This prevents a child from accessing the screw 16 with a screw driver and thereby prevents the cover plate 12 from being accidentally removed by a small child. Also the caps 14 are sufficiently large so that even if a child were able to removed one of the caps 14 from the cover plate 12, the cap 14 is large enough to make it difficult for a small child to get the cap 14 into their mouth a sufficient distance to choke the child.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. An electrical outlet safety cover comprising:
    a cover plate attachable to an electrical outlet as a replacement for the electrical cover plate,
    said cover plate having at least one electrical socket access opening for accessing an electrical socket on an electrical outlet to which the cover plate attaches,
    a cap removably attached to said cover plate for covering each electrical socket access opening, and each said cap removably attached to slots provided in a rear side of the cover plate.

2. An electrical outlet safety cover according to claim 1 further comprising:
    a screw for engaging a screw receiving opening provided in an electrical outlet as a means of securing the cover plate to an electrical outlet.

3. An electrical outlet safety cover according to claim 2 wherein said caps cover said screw when the caps are attached to said cover plate thereby preventing the cover plate from being removed from the electrical outlet while the caps are attached to the cover plate.

4. An electrical outlet safety cover according to claim 1 further comprising:
    tabs provided on the child proof safety caps for engaging said slots.

5. An electrical outlet safety cover according to claim 4 wherein each said cap is capable of flexing inwardly when squeezed to move the tabs located on opposite sides of the cap toward each other sufficiently so that the tabs may pass through one of the electrical socket acess openings provided on the cover.

6. An electrical outlet safety cover according to claim 5 wherein each said cap is constructed of resilient material which allows the cap and the tabs on the cap to regain their original configuration when the cap is no longer being squeezed.

7. An electrical outlet safety cover according to claim 5 further comprising:
    a screw for engaging a screw receiving opening provided in an electrical outlet as a means of securing the cover plate to an electrical outlet.

8. An electrical outlet safety cover according to claim 7 wherein said caps cover said screw when the caps are attached to said cover plate thereby preventing the cover plate from being removed from the electrical outlet while the caps are attached to the cover plate.

9. An electrical outlet safety cover according to claim 1 wherein each said cap is sufficiently large as to prevent a child from inserting the cap into the child's mouth a sufficient distance to choke the child.

* * * * *